(12) United States Patent
Sputhe

(10) Patent No.: US 6,487,927 B1
(45) Date of Patent: Dec. 3, 2002

(54) AUTOMATIC NEUTRAL FINDER FOR A MOTORCYCLE TRANSMISSION

(76) Inventor: Alan C. Sputhe, 11185 Lime Kiln Rd., Grass Valley, CA (US) 95949

( * ) Notice: Subject to any disclaimer, the term of this patent is extended or adjusted under 35 U.S.C. 154(b) by 0 days.

(21) Appl. No.: 09/627,754

(22) Filed: Jul. 28, 2000

Related U.S. Application Data

(60) Provisional application No. 60/150,400, filed on Aug. 23, 1999.

(51) Int. Cl.$^7$ ................................................. G05G 5/02
(52) U.S. Cl. ..................... 74/473.23; 74/142; 74/337.5; 74/473.16; 180/230
(58) Field of Search ............................... 74/142, 337.5, 74/473.16, 473.23; 180/230

(56) References Cited

U.S. PATENT DOCUMENTS

| | | | |
|---|---|---|---|
| 2,920,504 A | | 1/1960 | Sommer |
| 3,347,108 A | | 10/1967 | Hinke |
| 3,365,972 A | | 1/1968 | Luke et al. |
| 3,464,280 A | | 9/1969 | Onda |
| 4,010,379 A | * | 3/1977 | Shimamoto ................. 180/271 |
| 4,337,675 A | | 7/1982 | Holdeman |
| 4,455,884 A | | 6/1984 | Tsuruta et al. |
| 4,491,031 A | | 1/1985 | Ooka |
| 4,624,350 A | * | 11/1986 | Akashi ...................... 74/337.5 |
| 4,631,984 A | * | 12/1986 | Jones ....................... 74/473.23 |
| 4,730,506 A | * | 3/1988 | Kageyama ................ 74/337.5 |
| 5,046,596 A | | 9/1991 | Dennert |
| 5,186,070 A | | 2/1993 | Nitzschke et al. |
| 5,220,984 A | * | 6/1993 | Ruiter ...................... 192/220.4 |
| 6,076,416 A | | 6/2000 | Sputhe |
| 6,186,263 B1 | * | 2/2001 | Takano ..................... 74/473.23 |

FOREIGN PATENT DOCUMENTS

| | | |
|---|---|---|
| DE | 1955868 | 12/1970 |
| DE | 28 26 040 | 12/1979 |
| JP | 59-1848 | 1/1984 |
| JP | 59-50257 | 3/1984 |
| JP | 60-73158 | 4/1985 |
| JP | 62-98052 | * 5/1987 |

* cited by examiner

Primary Examiner—William C Joyce
(74) Attorney, Agent, or Firm—David Weiss

(57) ABSTRACT

Automatic neutral finder apparatus for a motorcycle transmission, for automatically locating and positively engaging the transmission's neutral position. A preferred embodiment of the apparatus includes a shifter cam rotatable about an axis through predetermined rotational displacements for effecting gear shifts and having a neutral position; a stop indexed to the neutral position of the cam; a plunger actuable for engaging the stop to stop rotation of the cam when the cam is at its neutral position; and a circuit associated with the plunger and including a switch operable by the motorcycle operator for actuating the plunger to engage the stop. The plunger is further actuable for disengaging the stop, and the switch is preferably operable by the motorcycle operator for actuating the plunger to disengage the stop.

33 Claims, 5 Drawing Sheets

AUTOMATIC NEUTRAL FINDER FOR A MOTORCYCLE TRANSMISSION

CROSS-REFERENCE TO RELATED PATENT APPLICATION

This application claims the benefit of U.S. Provisional Application No. 60/150,400, filed Aug. 23, 1999, and the disclosure of said Provisional Application is incorporated herein by reference.

FIELD OF THE INVENTION

This invention relates to gear shifters for motorcycle transmissions, and more particularly to a device for a motorcycle transmission for automatically locating and positively engaging the transmission's neutral position.

BACKGROUND OF THE INVENTION

Typical motorcycle transmissions include a gear shifter mechanism including a shifter cam that is caused to rotate through predetermined rotational displacements for effecting gear shifts. Such shifter cam rotations are effected by the motorcycle operator's foot operating a shifter lever coupled to the shifter cam for causing each gear to be sequentially engaged. Successively moving the foot operated shifter lever to the limit of its travel in one direction causes the transmission to shift into higher gears, while moving the lever to the limit of its travel in the other direction causes the transmission to be shifted into lower gears.

The conventional motorcycle transmission has a neutral position in which the rotational input from the engine is not transferred to the output shaft. Detents on the shifter cam are located at positions corresponding to the engagement positions of each gear and of neutral, and a spring-loaded plunger or other device bears against the appropriate detent for maintaining the shifter cam against further rotational movement after the shifter lever returns to its centered position. During a shift operation, a sufficient rotational force is applied to the shifter cam for rotating the shifter cam and for causing the spring-biased plunger to retract from its detent.

The neutral position of a motorcycle gear shifter is typically located between first and second gears and is not engageable at a cam position corresponding to any shifter lever limit of travel. Neutral may be selected by down-shifting the transmission from second gear but allowing the shifter lever to travel through only a portion of its arc. Similarly, neutral may be engaged by up-shifting from first gear and allowing the lever to travel through only a portion of its arc. In either case, the neutral position is determined by a change in the operator's foot pressure for rotating the shifter cam to a position for permitting the neutral detent to be engaged by the spring-loaded plunger. In actual practice, the neutral position is often difficult to locate and engage, so that in attempting to shift into neutral from second gear an overshift frequently occurs resulting in first gear being engaged instead. Similarly, when attempting to shift into neutral from first gear, an overshift may occur resulting in second gear being engaged.

SUMMARY OF THE INVENTION

The difficulties in finding and positively engaging the neutral position of prior art motorcycle transmissions are avoided by the present invention, which provides an automatic neutral finder apparatus for causing the shifter cam to stop its rotation at the neutral position upon the motorcycle operator's operation of a switch while down-shifting from second gear or up-shifting from first gear. The transmission's spring-loaded gear-maintaining plunger is thereupon permitted to engage the cam's neutral detent for maintaining the shifter cam in its neutral position until the next forward ratio gear shift is commenced by the operator.

In a motorcycle transmission according to the present invention, there is provided neutral finder apparatus operable by a motorcycle operator comprising in combination: a shifter cam rotatable about an axis through predetermined rotational displacements for effecting gear shifts and having a neutral position; a stop indexed to the neutral position of the cam; a plunger actuable for engaging the stop to stop rotation of the cam when the cam is at its neutral position; and a circuit associated with the plunger and including a switch operable by the motorcycle operator for actuating the plunger to engage the stop. The plunger is further actuable for disengaging the stop, and the switch may be operable by the motorcycle operator for actuating the plunger to disengage the stop. The circuit may include a lamp that is energized when the transmission is in neutral for signaling the motorcycle operator to operate the switch for actuating the plunger to disengage the stop.

The circuit preferably precludes actuation of the plunger to engage the stop unless the cam is rotated such that the plunger is positioned within a predetermined range of the stop. Where the neutral position is between two consecutive gear positions of the cam (such as between first gear and second gear), the circuit preferably precludes actuation of the plunger to engage the stop unless the cam is rotationally displaced within a range of rotational displacements between such two consecutive gear positions.

BRIEF DESCRIPTION OF THE DRAWINGS

The novel features believed to be characteristic of the invention, together with further advantages thereof, will be better understood from the following description considered in connection with the accompanying drawings in which preferred embodiments are illustrated by way of example. It is to be expressly understood, however, that the drawings are for the purpose of illustration and description only and are not intended as a definition of the limits of the invention.

DESCRIPTION OF THE PREFERRED EMBODIMENTS

Figure 1:
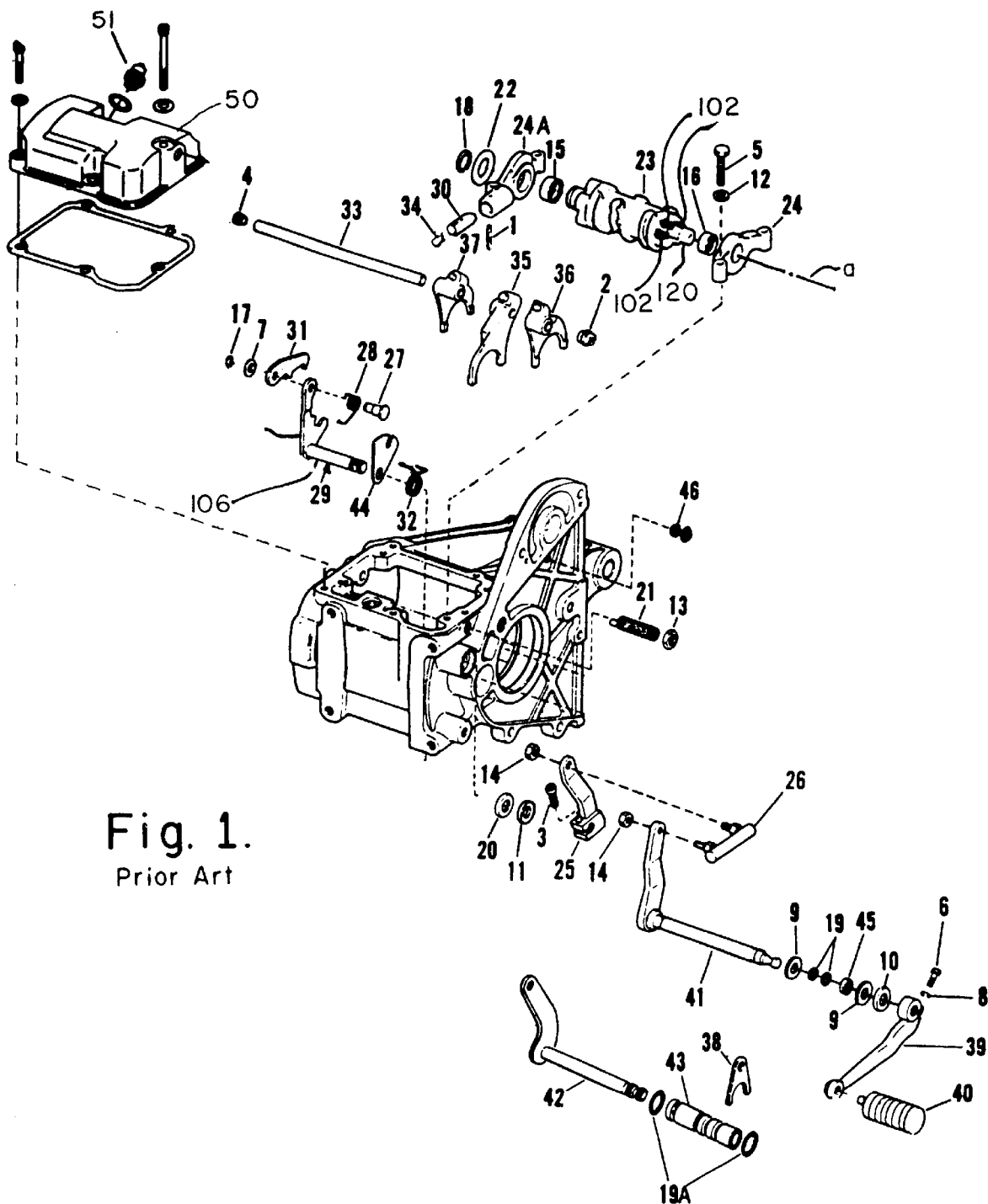
FIG. 1 is an exploded perspective view of a conventional gear shifter for a motorcycle transmission.

Turning to FIG. 1, the conventional gear shifter apparatus shown therein is for HARLEY-DAVIDSON® motorcycle transmission. The reference nemerals 1-51 contained in FIG. 1 correspond to gear shifter parts identified in the following Table 1, including part numbers and names, as marketed by HARLEY-DAVIDSON®.

TABLE 1

| Reference No. | PART NO. | NAME |
| --- | --- | --- |
| 1 | 601 | ROLL PIN |
| 2 | 721 | PLUG, shifter fork shaft-right |
| 3 | 856 | SCREW |
|  | 3567 | SCREW |
| 4 | 3784 | SET SCREW, shifter fork shaft - left |
| 5 | 3993 | BOLT (4) |
| 6 | 4016 | BOLT |
| 7 | 6016 | WASHER (as required) |
| 8 | 6314W | LOCKWASHER |
| 9 | 6381 | WASHER (2) |
| 10 | 6409 | WASHER |
| 11 | 6497HW | WASHER |
| 12 | 6736 | WASHER (4) |
| 13 | 7515 | JAMNUT |
| 14 | 7744 | NUT (2) |
| 15 | 9114 | NEEDLE BEARING, right cam support |
| 16 | 9115 | NEEDLE BEARING, left cam support |
| 17 | 11016 | RETAINING RING |
| 18 | 11083 | RETAINING RING |
| 19 | 11148 | QUAD SEAL (2) |
| 19A | 11117 | O-RING, shifter lever sleeve (2) |
| 20 | 12045 | SEAL |
| 21 | 33119-79A | ADJUSTING SCREW, shifter arm |
| 22 | 33205-80 | THRUST WASHER, .017 thick |
|  | 33206-80 | THRUST WASHER, .020 thick |
|  | 33207-80 | THRUST WASHER, .022 thick |
|  | 33208-80 | THRUST WASHER, .025 thick |
|  | 33209-80 | THRUST WASHER, .028 thick |
|  | 33210-80 | THRUST WASHER, .031 thick |
|  | 33211-80 | THRUST WASHER, .035 thick |
|  | 33212-80 | THRUST WASHER, .039 thick |
| 23 | 33320-79A | SHIFTER CAM |

TABLE 1-continued

| Reference No. | PART NO. | NAME |
| --- | --- | --- |
| 24 | 33326-79 | SUPPORT, shifter cam - left |
| 24A | 3332-79 | SUPPORT, shifter cam - right |
| 25 | 33715-80A | LEVER, transmission shifter rod |
|  | 33715-85 | LEVER, transmission shifter rod |
| 26 | 33728-82 | BALL JOINT |
| 27 | 34082-79 | PIN, shifter shaft lever |
| 28 | 34083-79 | SPRING, shifter shaft lever |
| 29 | 34084-80 | LEVER, shifter shaft w/pin and spring |
| 30 | 34085-79 | CAM FOLLOWER |
| 31 | 34086-79 | PAWL, shifter cam |
| 32 | 34087-79 | SPRING, shifter shaft |
| 33 | 34088-79 | SHAFT, shifter fork |
| 34 | 34089-79 | SPRING |
| 35 | 34191-79C | SHIFTER FORK, $1^{ST}$ & $2^{ND}$ |
|  | 34191-84 | SHIFTER FORK, $1^{ST}$ & $2^{ND}$ |
| 36 | 34193-79C | SHIFTER FORK, $3^{RD}$ & $5^{TH}$ |
|  | 34193-84 | SHIFTER FORK, $3^{RD}$ & $5^{TH}$ |
| 37 | 34195-79C | SHIFTER FORK, $4^{TH}$ |
|  | 34195-84 | SHIFTER FORK, $4^{TH}$ |
| 38 | 34561-84 | SLEEVE LOCATOR PLATE |
| 39 | 34599-81 | LEVER, shifter |
| 40 | 34611-65 | COVER, shifter lever (black) |
| 41 | 34621-82 | SHIFTER LEVER ASSEMBLY |
| 42 | 34621-84 | SHIFT LEVER |
| 43 | 34632-84 | SLEEVE, shift lever |
| 44 | 35068-79 | PLATE |
| 45 | 60629-82 | BUSHING |
| 46 | 61082-79 | PLUG |
| 50 |  | COVER, upper |
| 51 |  | SWITCH, neutral indicator |

Figure 2:
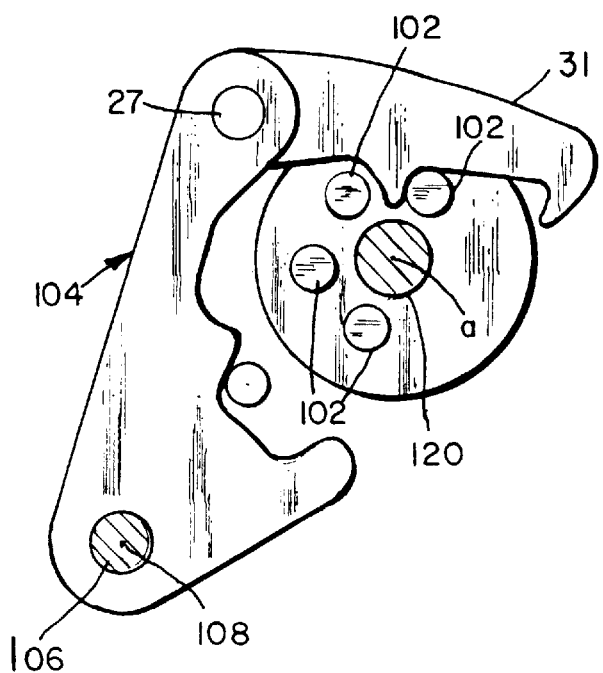
FIG. 2 is an elevation view of the conventional shifter shaft lever and cam pawl of FIG. 1 in operational relation with the shifter cam drum, looking generally from right (front) to left (rear) in the drawing of FIG. 1.
Figure 3:
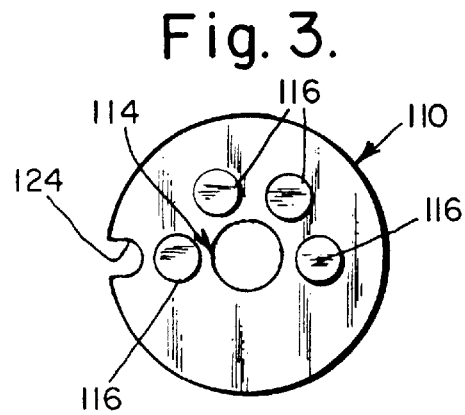
FIG. 3 is a rear elevation view of a preferred embodiment of a neutral finder wheel or stop plate included in a preferred embodiment of the neutral finder apparatus of the present invention.
Figure 4:
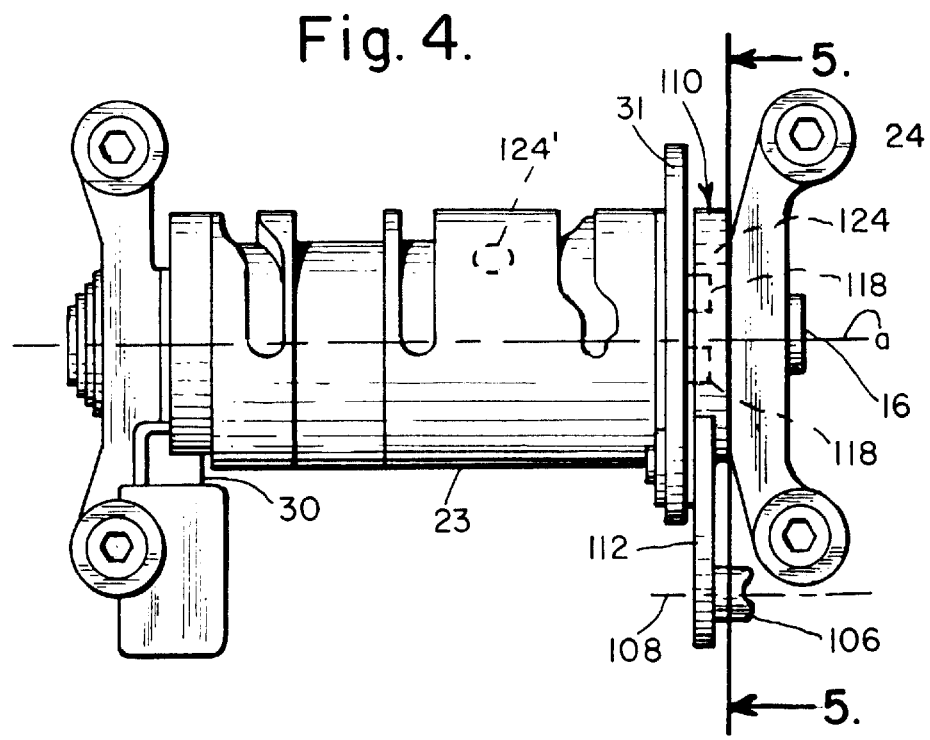
FIG. 4 is a top view of the shifter cam drum and the shifter shaft lever/cam pawl apparatus of FIGS. 1 and 2 shown in combination with the neutral finder wheel of FIG. 3.

The shifter shown in FIG. 1 includes a shifter cam drum 23 for effecting gear shifts in conventional manner through selective cooperation with shifter forks 35, 36, 37 upon rotation of the shifter cam about its longitudinal axis a through predetermined rotational displacements. As also shown in FIG. 2, a plurality of pins 102 longitudinally extend from and forwardly of the shifter cam 23, and are spaced about the longitudinal axis a (preferably along a circle with axis a as its center) at locations for producing cam displacements corresponding to gear shift selections. The gear shifter apparatus further includes a spring-biased shifter shaft and lever combination 29, which includes a shifter shaft lever 104 and a shifter shaft 106. Gear shifting is conventionally accomplished by applying force to the shifter lever shaft 106 to rotate the shaft 106, which causes the shifter shaft lever 104 to pivot against its spring bias and about pivot axis 108. The shifter shaft lever 104 is pivotally coupled by pivot pin 27 to a spring-retracted cam pawl 31 operating as a ratchet for progressively engaging the pins 102 on the shifter cam 23, causing the shifter cam 23 to rotate through predetermined rotational displacements for effecting gear shifts.

A foot operated shifter lever 39, mechanically coupled to the shifter shaft lever 104, is typically utilized for causing each gear to be sequentially engaged. After each gear shift the lever returns to a centered position; successively moving the lever to the limit of its travel in one direction causes the transmission to shift into higher gears, while moving the lever to the limit of its travel in the other direction causes the transmission to be shifted into lower gears.

The conventional motorcycle transmission has a neutral position in which the rotational input from the engine is not transferred to the output shaft. Detents on the shifter cam are located at positions corresponding to the engagement positions of each gear and of neutral, and a spring-loaded plunger 30 or other device bears against the appropriate detent for maintaining the shifter cam 23 against further rotational movement after the shifter lever returns to its centered position. During a shift operation, a sufficient rotational force is applied to the shifter shaft 106 for rotating the shifter cam 23 and causing the spring-biased plunger 30 to retract from its detent.

The neutral position is typically located between first and second gears and is not engageable at a cam position corresponding to any shifter lever limit of travel. Neutral may be selected by down-shifting the transmission from second gear, but manipulating the foot-operated shifter lever 39 for causing the shifter shaft lever 104 to pivot through only a portion of its arc. Similarly, neutral may be engaged by up-shifting from first gear and allowing the lever to pivot through only a portion of its arc. In either case, the neutral position is determined by a change in the operator's foot pressure required to rotate the shifter shaft lever 104 for permitting the plunger 30 to engage the neutral detent. In actual practice, the neutral position is often difficult to locate and engage. Frequently, in attempting to shift into neutral from second gear, an overshift occurs resulting in first gear being engaged. Similarly, when attempting to shift into neutral from first gear, an overshift may occur resulting in second gear being engaged.

The automatic neutral finder apparatus of the present invention causes the shifter cam to stop its rotation at the neutral position, upon the operator's actuation of a switch while down-shifting from second gear or up-shifting from first gear, permitting the plunger 30 to engage the cam's neutral detent for maintaining the shifter cam in its neutral position until the next forward ratio gearshift is commenced by the operator.

The preferred embodiment of the present invention comprises the gear shifter apparatus shown in FIG. 1, with the addition of a stop plate or neutral finder wheel 110 in operational relation with an operator-actuable solenoid 112 as shown in FIGS. 3–8. The neutral finder wheel 110 includes a center aperture 114 and a plurality (four in this example corresponding to the number and positions of the pins 102) of blind bores 116 for fittingly receiving end portions 118 of the pins 102, respectively, when the wheel 110 is positioned at the front of the shifter cam drum 23 with the shifter cam shaft 120 fitted in the wheel 110's center aperture 122. The neutral finder wheel 110 includes a stop, preferably a notch or indentation 124 (although a radial projection may alternatively be provided), positioned on the wheel 110 (preferably at the periphery of the wheel 110) at a location indexed to the neutral position of the shifter cam. As shown in FIGS. 4–7, the neutral finder wheel 110 is positioned on the shifter cam drum 23 such that the pawl 31 is to the rear of the wheel 110, so that the pawl 31 may engage the pins 102 individually for stepwise rotating the shifter cam drum 23 and the wheel 110 by the same rotational displacement. The wheel 110 is axially retained or trapped in this position (i.e. restrained against movement along the longitudinal axis a of the shifter cam drum 23), for example by the forward ends of the pins 102 contacting the blind ends of the bores 116 and by the pillow block 24.

Figure 6:
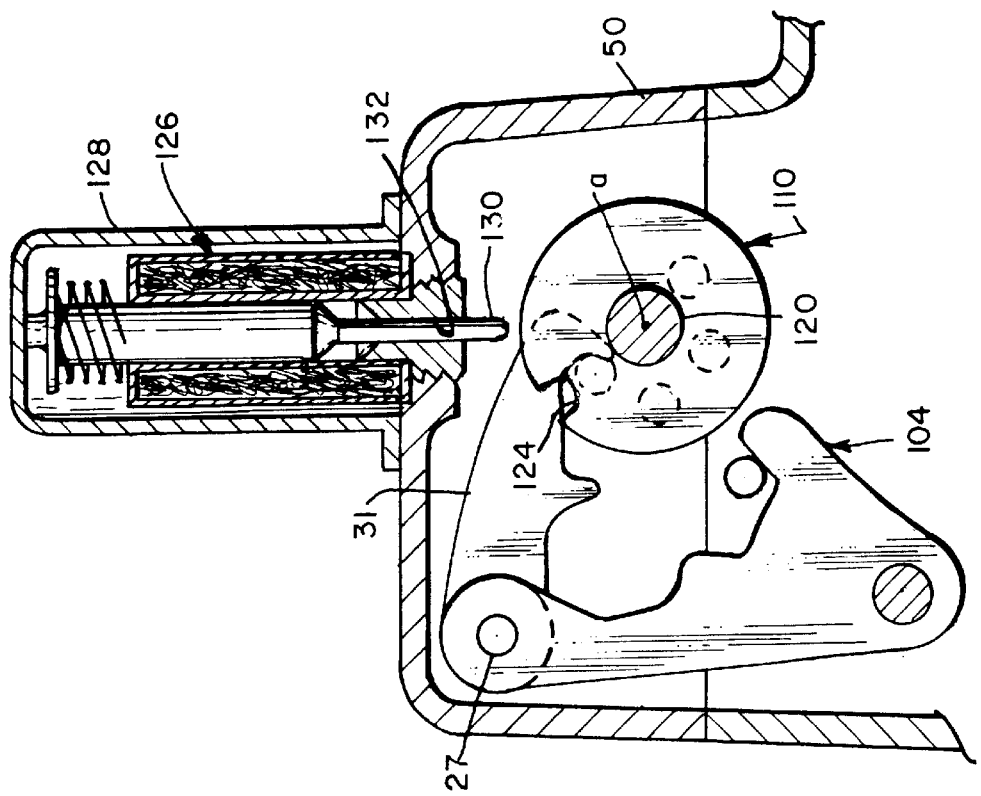
FIG. 6 shows the apparatus of FIG. 5, indicating the position of the neutral finder wheel when the transmission is in first gear.
Figure 5:
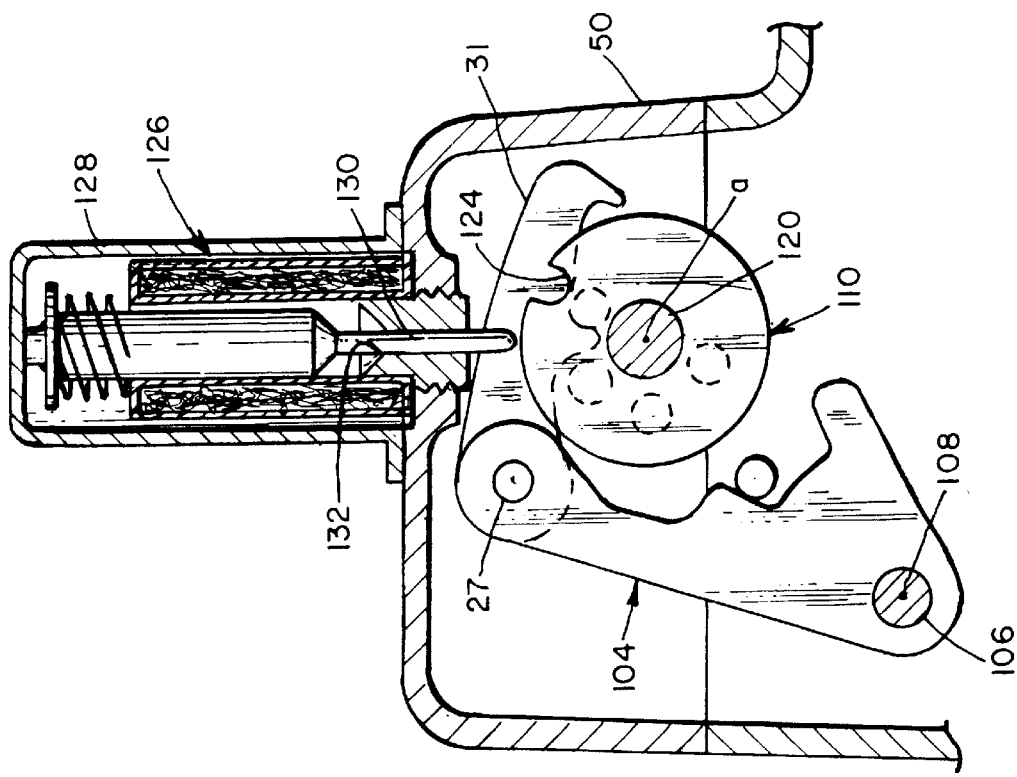
FIG. 5 is a front partially cross-sectional view of the preferred embodiment of the neutral finder device of the present invention, taken along the line 5—5 of FIG. 4 in the direction of the appended arrows, specifically showing the position of the neutral finder wheel and its relation to a solenoid included in the invention's preferred embodiment when the transmission is in second gear.
Figure 7:
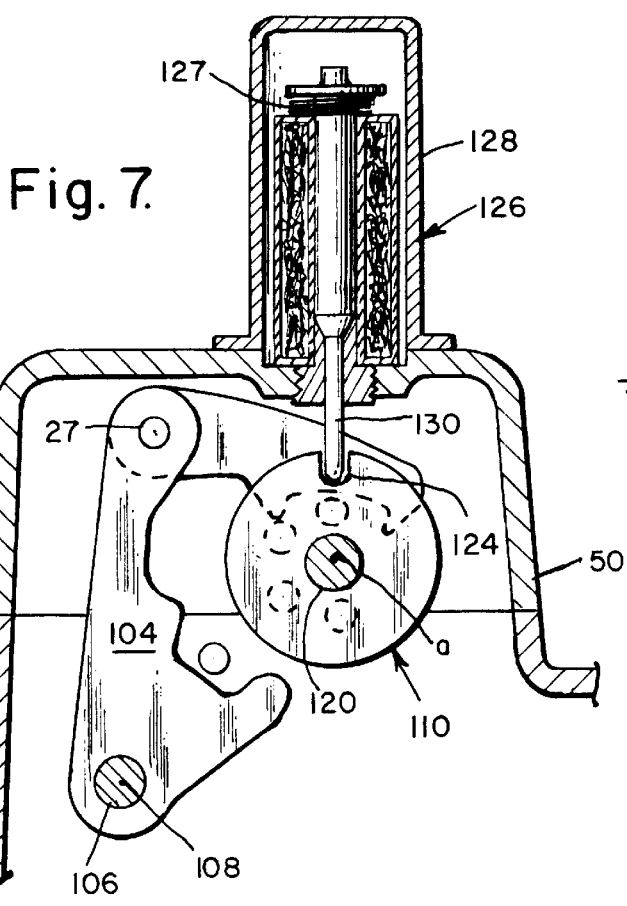
FIG. 7 shows the apparatus of FIGS. 5 and 6, indicating the position of the neutral finder wheel and its operational engagement with the solenoid for automatically locating and engaging the shifter cam at its neutral position.
Figure 8:
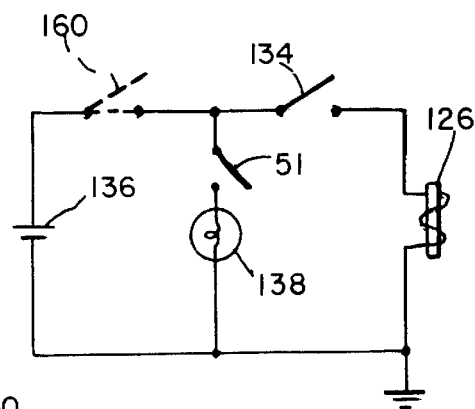
FIG. 8 is a schematic diagram of an electrical circuit included in the preferred embodiment of the present invention.

As shown in FIGS. 5–7, a solenoid 126 (within a housing 128) is secured to the transmission housing's upper cover 50 such that the solenoid's longitudinally moveable armature or plunger 130 extends through a bore 132 in the cover 50 and is oriented along a radius of the wheel 110. As shown in FIG. 7, the stop indentation 124 is positioned on the wheel 110 such that it is engageable by the free end of the solenoid plunger 130 when the shifter cam 23 (and hence the neutral finder wheel 110) is at that point in its rotation corresponding to the neutral position.

When the motorcycle operator desires to shift into neutral, he/she may depress a handlebar-mounted pushbutton switch 134 (see FIG. 8) when down-shifting from second gear (FIG. 5) or up-shifting from first gear (FIG. 6), energizing the solenoid 126 from battery 136. This causes the solenoid plunger 130 to axially move such that its tip rides against the periphery of the rotating wheel 110 and then into engagement with indentation 124 (FIG. 7) when the rotation of the cam 23 is at the neutral position. This causes cam rotation to stop, allowing the transmission's spring-biased plunger 30 to engage the cam's neutral detent. When the transmission is in neutral (which may be indicated to the operator by energization of a handlebar-mounted neutral indicator lamp 138 upon the automatic closing of a neutral indicator switch 51, well known in the motorcycle transmission art), the operator releases (opens) the solenoid pushbutton switch 134 thereby de-energizing the solenoid 126 and causing retraction of the solenoid plunger 130 and disengagement from the stop indentation 124 by restoring action of the spring 127.

It may be appreciated that instead of there being provided a separate neutral finder wheel 110 fitted onto the shifter cam 23, the neutral finder peripheral stop may be integral with the shifter cam 23. In one such embodiment, the position of a stop indentation 124', which may be a blind bore shown in phantom in FIG. 4, and the position of the solenoid 126 on the transmission upper cover 50 are such that the indentation 124' and the solenoid plunger 130 would be aligned for engagement for stopping cam rotation when the shifter cam 23 is at a point in its rotation where the transmission is in neutral.

It may be further appreciated that the stop indentation 124 or 124' may be replaced by a radial projection having a leading edge positioned for striking the extended solenoid plunger 130 when the shifter cam 23 is in its neutral position during a downshift from second gear, or by a radial projection having a leading edge position for striking the extended solenoid plunger 130 when the shifter cam 23 is in its neutral position during an upshift from first gear.

A mechanically operated plunger may be substituted for the electrically operated solenoid, and in either case the neutral stop plunger may be installed in any convenient location that restricts the movement of the cam drum by bearing against an appropriate projection or indentation on the cam drum, the indexed neutral finder wheel, the shift lever or any of the intermediate linkage.

Figure 9:
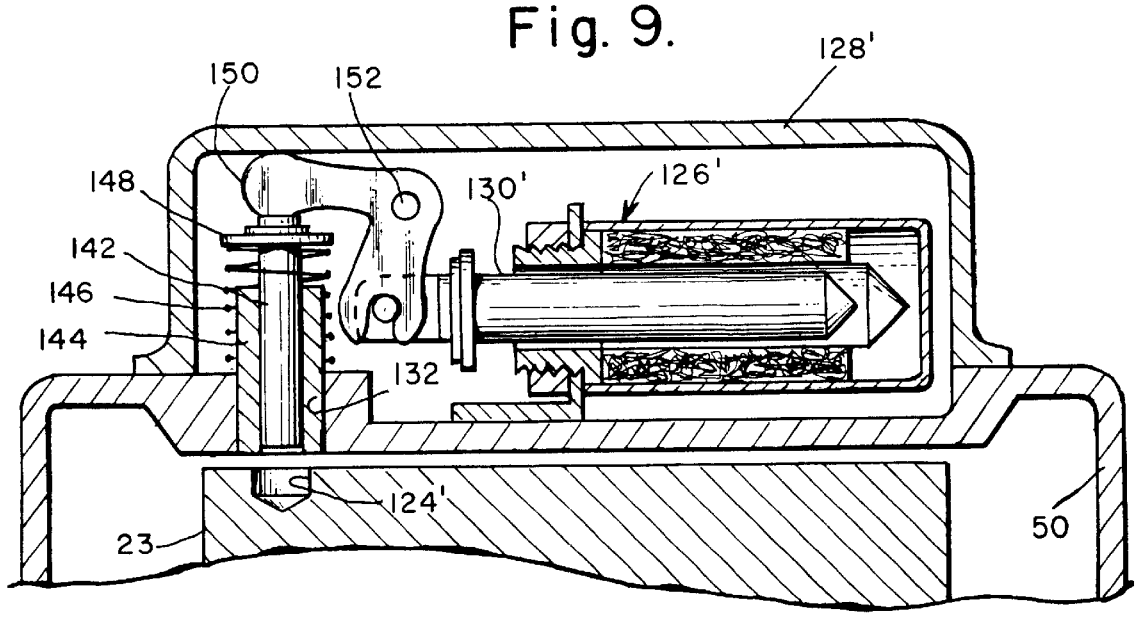
FIG. 9 is a fragmentary cross-sectional view of a variation of the preferred embodiment of the neutral finder device of the present invention, taken along the longitudinal dimension of the shifter cam drum.

FIG. 9 shows one configuration of a mechanically operated neutral stop plunger 142 operatively coupled to a pull type solenoid 126', the combination housed in the solenoid cover 128' secured to the transmission case upper cover 50 housing the shifter cam drum 23. The stop plunger 142 is positioned with respect to the neutral stop indentation 124' on the cam drum 23 (or the stop indentation 124 on the neutral finder wheel 110 of FIG. 3) in the same manner as previously described with respect to the solenoid plunger 130 operating as a stop plunger. The stop plunger 142 communicates with the cam 23 through bore 132 in the upper cover 50, and is supported for longitudinal movement by the hardened bushing 144, and is upwardly biased by the helical spring 146 retained between the spring collar 148 and the cover 50. Downward movement of the neutral stop plunger 142 is controlled by energization of the solenoid 126', causing longitudinal movement (to the right as viewed in the drawing of FIG. 9) of the solenoid plunger 130' which in turn causes the coupled bell crank 150 to pivot about pivot pin 152 in the counterclockwise direction. De-energization of the solenoid 126' causes clockwise pivoting of the bell crank, resulting in the stop plunger 142 being retracted from the neutral indentation 124' (or 124) by restoring action of the spring 146.

Figure 10:
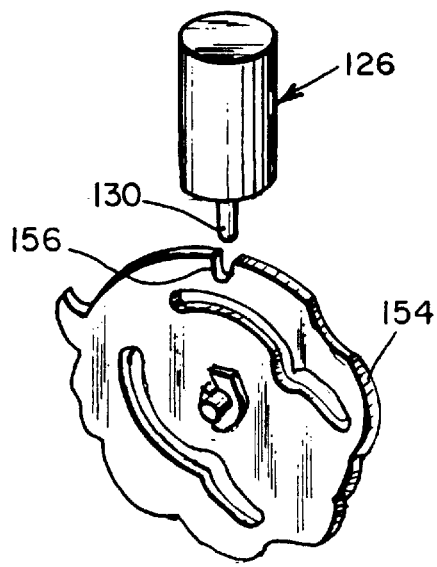
FIG. 10 is a perspective view of one configuration of an alternative embodiment of the present invention including a shifter cam plate.
Figure 11:
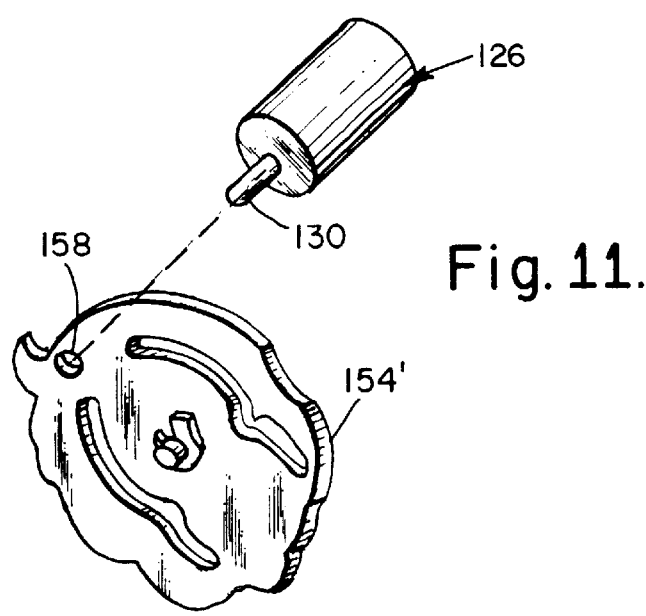
FIG. 11 is a perspective view of a second configuration of the shifter cam plate embodiment of FIG. 10.
Figure 12:
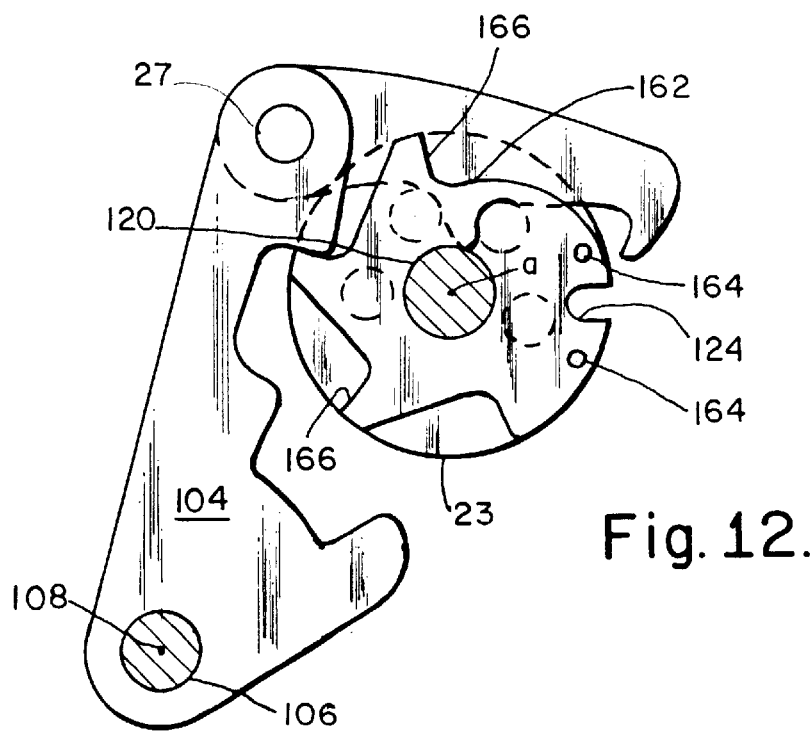
FIG. 12 is a front elevation view of a variation of the apparatus of FIG. 4, taken along the line 5—5 in the direction of the appended arrows, in which the neutral finder wheel of FIG. 3 is configured as a spur wheel, specifically a modified version of the spur wheel disclosed in applicant's U.S. patent application Ser. No. 09/246,254 filed Feb. 8, 1999, for a positive-stop gear shifter, the disclosure of said patent application being incorporated herein by reference.

The device of the present invention is applicable as well to transmissions utilizing shifter cam devices other than a drum, such as a shifter cam plate. In the example shown in FIG. 10, a conventional Harley-Davidson shifter cam plate 154 is modified in accordance with the present invention by incorporating along the periphery thereof, at a location corresponding or indexed to the rotational position of the disk 154, a notch or stop indentation 156. The indentation 156 will be aligned with the stop plunger of the present invention, such as the plunger 130 of the solenoid 126. In similar manner, the modified conventional shifter cam plate 154' of FIG. 11 incorporates an indentation or aperture 158 in or through the face of the cam plate 154', the aperture or indentation 158 being located at a position corresponding or indexed to the cam plate's neutral position. The cam plate 154' may be stopped when in neutral by engagement of the plunger 130 of solenoid 126 with the stop aperture or indentation 158.

Activation of the solenoid 126 may be restricted to gear shifts between first and second by including an additional switch 160 (see solenoid actuation circuit of FIG. 8) which is actuated by the shifter cam when positioned between first and second gears, or when within a smaller desired range between first and second. The range switch 160 would be closed only during times when the shifter cam were positioned within the desired range, so that the operator's depressing the pushbutton switch would not energize the solenoid 126 when the shifter cam rotational position is such that the solenoid plunger 130 is outside this range. This would prevent accidental shifts into false neutrals between gears other than the actual neutral between first and second. Such restriction would also be desirable if there were projections or indentations in positions other than at neutral, that the plunger 130 may strike or enter if the solenoid 126 were accidentally energized during rotation of the shifter cam, and would also be desirable if the plunger 130 were acting on a portion of the shifting mechanism other than the shifter cam.

The automatic neutral finder of the present invention may be combined with the positive stop gear shifter invention disclosed in U.S. patent application Ser. No. 09/246,254 filed Feb. 8, 1999, the disclosure of which is incorporated herein by reference. As shown in FIG. 9, the combined neutral finder/spur wheel 162 is a modified version of the spur wheel disclosed in the incorporated patent application, in which the non-toothed portion of the referenced spur wheel is extended to cooperate with the solenoid plunger 130 of the present invention and the stop indentation 124 is positionally associated with or indexed to the positions of the pins 102 such that the solenoid plunger 130 engages the stop indentation 124 when the shifter cam drum 23 is in its neutral rotational position. The modified spur wheel 162 preferably includes projections 164 thereon, on either side of the stop, indention 124, for actuating the range switch 160 in the solenoid circuit (FIG. 8) for restricting the operation of the solenoid 126 (when the pushbutton switch 134 is depressed) for precluding engagement of the spur wheel teeth 166 with the extended solenoid plunger 130, as well as for restricting operation of the solenoid 126 to gear shifts between first and second gears.

Thus, there has been described an automatic neutral finder apparatus for a motorcycle transmission, for automatically locating and positively engaging the transmission's neutral position. Other embodiments of the invention, and variations of the embodiments presented herein may be developed without departing from the essential characteristics thereof. Accordingly, the invention should be limited only by the scope of the claims listed below.

I claim:

1. In motorcycle transmission, neutral finder apparatus operable by a motorcycle operator comprising in combination:

a shifter cam rotatable about an axis through predetermined rotational displacements for effecting gear shifts and having a neutral position;

a stop on said cam and indexed to said neutral position of said cam;

a plunger actuable for engaging said stop to stop rotation of said cam when said cam is at said neutral position; and a circuit associated with said plunger and including switch operable by the motorcycle operator for actuating said plunger to engage said stop.

2. The apparatus according to claim 1, wherein: said plunger is actuable for disengaging said stop.

3. The apparatus according to claim 1, wherein: said switch is operable by the motorcycle operator for actuating said plunger to disengage said stop.

4. The apparatus according to claim 3, wherein: said circuit includes a lamp energized when the transmission is in neutral for signaling the motorcycle operator to operate said switch for actuating said plunger to disengage said stop.

5. The apparatus according to claim 1, wherein:
said neutral position is between two consecutive gear positions of said cam; and
said circuit precludes actuation of said plunger to engage said stop unless said cam is rotationally displaced within a range of rotational displacements between said two consecutive gear positions.

6. The apparatus according to claim 1, wherein:
said circuit precludes actuation of said plunger to engage said stop unless said cam is rotated such that said plunger is positioned within a predetermined range of said stop.

7. The apparatus according to claim 1, wherein: said stop comprises an indentation in said cam.

8. The apparatus according to claim 1, wherein: said cam comprises a cam drum.

9. The apparatus according to claim 8, wherein: said stop comprises an indentation in said cam drum.

10. The apparatus according to claim 1, wherein: said cam comprises a cam plate.

11. The apparatus according to claim 10, wherein: said stop comprises an indentation in said cam plate.

12. The apparatus according to claim 1, wherein:
said cam comprises a cam plate; and
said stop comprises an aperture in a face of said cam plate.

13. In a motorcycle transmission, neutral finder apparatus operable by a motorcycle operator comprising in combination:

a shifter cam rotatable about an axis through predetermined rotational displacements for effecting gear shifts and having a neutral position;

a wheel coupled to said cam and rotatable therewith about said axis;

a stop on said wheel and indexed to said neutral position of said cam;

a plunger actuable for engaging said stop to stop rotation of said cam when said cam is at said neutral position; and a circuit associated with said plunger and including a switch operable by the motorcycle operator for actuating said plunger to engage said stop.

14. The apparatus according to claim 13, wherein:

said stop comprises an indentation in said wheel.

15. The apparatus according to claim 13, wherein:

said cam comprises a cam drum.

16. The apparatus according to claim 15, wherein:

said cam drum includes a plurality of pins longitudinally extending therefrom and spaced about said axis; and said wheel includes a plurality of bores respectively receiving portions of said pins such that said wheel and said cam drum are rotatable together about said axis.

17. In a motorcycle transmission, neutral finder apparatus operable by a motorcycle operator comprising in combination:

a shifter cam rotatable about an axis through predetermined rotational displacements for effecting gear shifts and having a neutral position;

a stop comprising an indentation in said cam and indexed to said neutral position of said cam;

a solenoid including a plunger, said solenoid actuable for causing said plunger to engage said stop to stop rotation of said cam when said cam is at said neutral position; and an electrical circuit associated with said solenoid, said circuit including a switch operable by the motorcycle operator for actuating said solenoid to cause said plunger to engage said stop.

18. The apparatus according to claim 17, wherein:

said solenoid is actuable for causing said plunger to disengage said stop.

19. The apparatus according to claim 17, wherein:

said switch is operable by the motorcycle operator for actuating said solenoid to cause said plunger to disengage said stop.

20. The apparatus according to claim 19, wherein:

said circuit includes a lamp energized when the transmission is in neutral for signaling the operator to operate said switch for actuating said solenoid to disengage said stop.

21. The apparatus according to claim 17, wherein:

said neutral position is between two consecutive gear positions of said cam; and said circuit precludes actuation of said solenoid to cause said plunger to engage said stop unless said cam is rotationally displaced within a range of rotational displacements between said two consecutive gear positions.

22. The apparatus according to claim 17, wherein:

said circuit precludes actuation of said solenoid to cause said plunger to engage said stop unless said cam is rotated such that said plunger is positioned within a predetermined range of said stop.

23. In a motorcycle transmission, neutral finder apparatus operable by a motorcycle operator comprising in combination:

a shifter cam drum rotatable about an axis through predetermined rotational displacements for effecting gear shifts and having a neutral position;

a stop indexed to said neutral position of said cam drum;

a plunger actuable for engaging said stop to stop rotation of said cam drum when said cam drum is at said neutral position; and a circuit associated with said plunger and including a switch operable by the motorcycle operator for actuating said plunger to engage said stop.

24. The apparatus according to claim 23, wherein:

said plunger is actuable for disengaging said stop.

25. The apparatus according to claim 23, wherein:

said switch is operable by the motorcycle operator for actuating said plunger to disengage said stop.

26. The apparatus according to claim 25, wherein:

said circuit includes a lamp energized when the transmission is in neutral for signaling the motorcycle operator to operate said switch for actuating said plunger to disengage said stop.

27. The apparatus according to claim 23, wherein:

said neutral position is between two consecutive gear positions of said cam drum; and said circuit precludes actuation of said, plunger to engage said stop unless said cam drum is rotationally displaced within a range of rotational displacements between said two consecutive gear positions.

28. The apparatus according to claim 23, wherein:

said circuit precludes actuation of said plunger to engage said stop unless said cam is rotated such that said plunger is positioned within a predetermined range of said stop.

29. The apparatus according to claim 23, wherein:

said stop comprises an indentation in said cam drum.

30. In a motorcycle transmission, neutral finder apparatus operable by a motorcycle operator comprising in combination:

a shifter cam rotatable about an axis through predetermined rotational displacements for effecting gear shifts and having a neutral position;

a stop at the periphery of said cam and indexed to said neutral position of said cam;

a solenoid including a plunger, said solenoid actuable for causing said plunger to engage said stop to stop rotation of said cam when said cam is at said neutral position; and an electrical circuit associated with said solenoid, said circuit including a switch operable by the motorcycle operator for actuating said solenoid to cause said plunger to engage said stop.

31. In a motorcycle transmission, neutral finder apparatus operable by a motorcycle operator comprising in combination:

a shifter cam rotatable about an axis through predetermined rotational displacements for effecting gear shifts and having a neutral position;

a wheel coupled to said cam and rotatable therewith about said axis;

a stop on said wheel and indexed to said neutral position of said cam;

a solenoid including a plunger, said solenoid actuable for causing said plunger to engage said stop to stop rotation of said cam when said cam is at said neutral position; and an electrical circuit associated with said solenoid, said circuit including a switch operable by the motorcycle operator for actuating said solenoid to cause said plunger to engage said stop.

32. In a motorcycle transmission, neutral finder apparatus operable by a motorcycle operator comprising in combination:

a shifter cam rotatable about an axis through predetermined rotational displacements for effecting gear shifts and having a neutral position;

a stop indexed to said neutral position of said cam;

a plunger actuable for engaging said stop to stop rotation of said cam when said cam is at said neutral position; and a circuit associated with said plunger and including a switch operable by the motorcycle operator for actuating said plunger to engage said stop, said switch being releasable by the motorcycle operator for actuating said plunger to disengage said stop.

33. In a motorcycle transmission, neutral finder apparatus operable by a motorcycle operator comprising in combination:

a shifter cam rotatable about an axis through predetermined rotational displacements for effecting gear shifts and having a neutral position;

a stop indexed to said neutral position of said cam;

a solenoid including a plunger, said solenoid actuable for causing said plunger to engage said stop to stop rotation of said cam when said cam is at said neutral position; and an electrical circuit associated with said solenoid, said circuit including a switch operable by the motorcycle operator for actuating said solenoid to cause said plunger to engage said stop, said switch being releasable by the motorcycle operator for actuating said solenoid to cause said plunger to disengage said stop.

* * * * *